L. FISCHER.
WRAPPER FOLDING MECHANISM.
APPLICATION FILED FEB. 5, 1912.
1,050,822.
Patented Jan. 21, 1913.
3 SHEETS—SHEET 2.
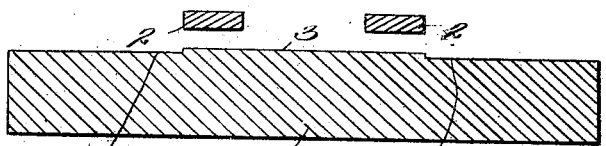
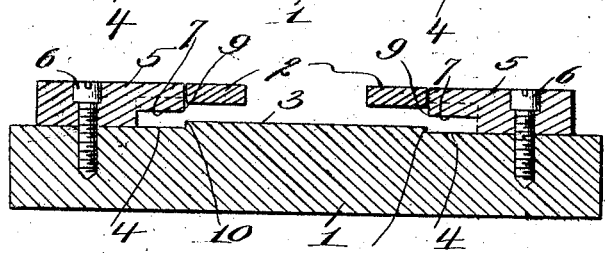
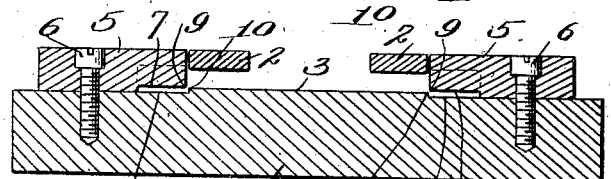
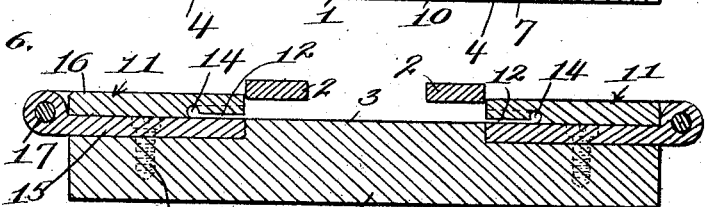
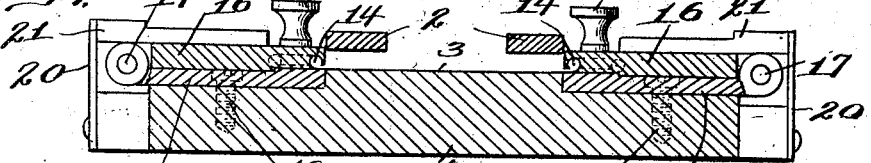
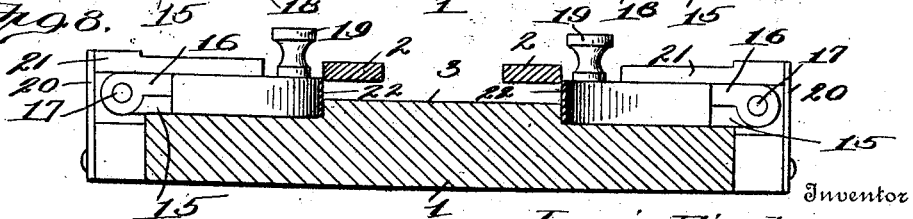
Witnesses
Inventor
Louis Fischer
By
Attorney

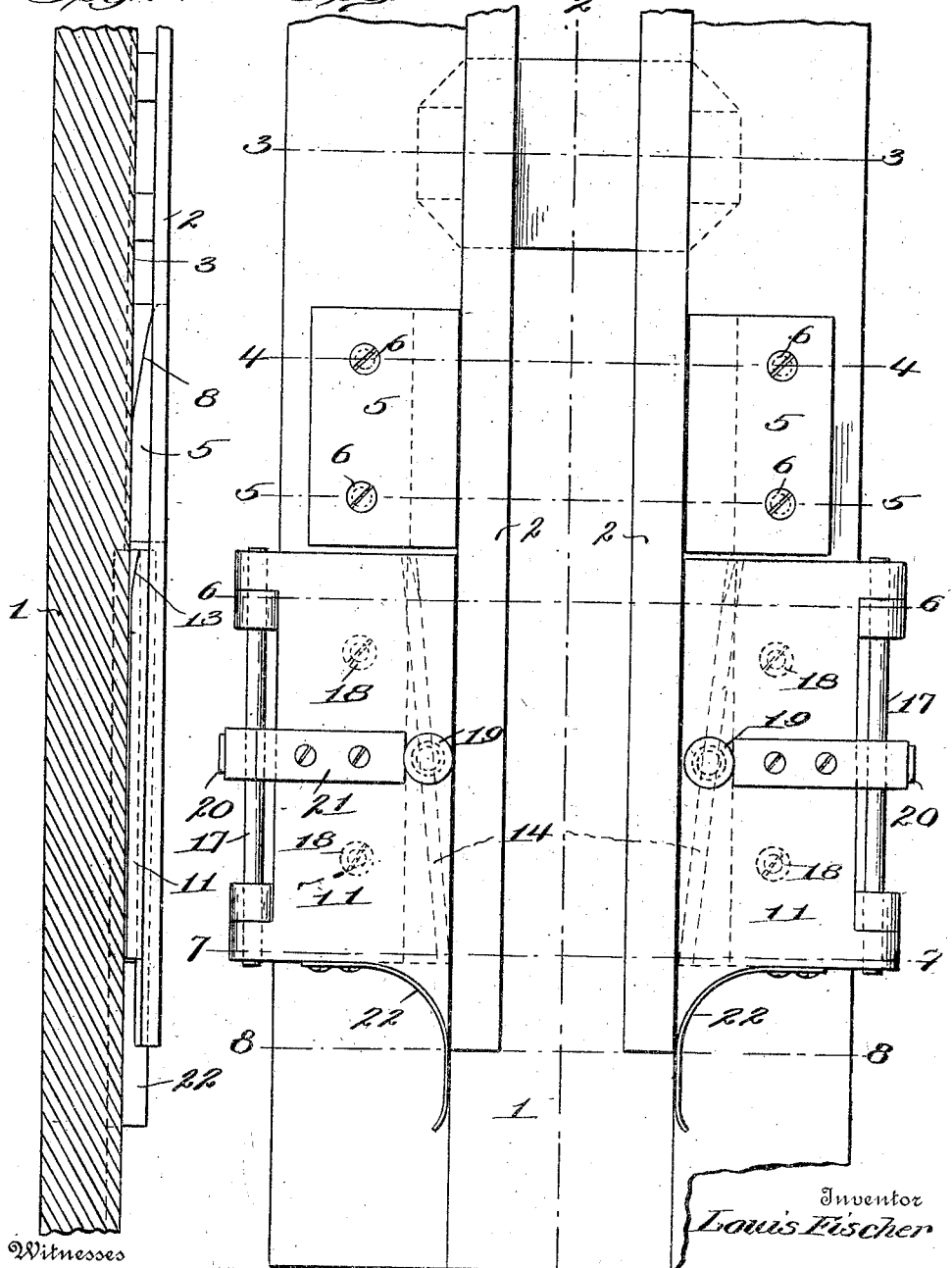

L. FISCHER.
WRAPPER FOLDING MECHANISM.
APPLICATION FILED FEB. 5, 1912.

1,050,822.

Patented Jan. 21, 1913.

3 SHEETS—SHEET 3.

Witnesses
C. A. Bateman

Inventor
Louis Fischer
By
Attorney

UNITED STATES PATENT OFFICE.

LOUIS FISCHER, OF PHILADELPHIA, PENNSYLVANIA, ASSIGNOR TO RICHARD H. WRIGHT, OF DURHAM, NORTH CAROLINA.

WRAPPER-FOLDING MECHANISM.

1,050,822.  Specification of Letters Patent.  Patented Jan. 21, 1913.

Application filed February 5, 1912. Serial No. 675,575.

*To all whom it may concern:*

Be it known that I, LOUIS FISCHER, a citizen of the United States, residing at Philadelphia, in the county of Philadelphia and State of Pennsylvania, have invented new and useful Improvements in Wrapper-Folding Mechanism, of which the following is a specification.

The present invention relates to improvements in wrapping mechanisms, and more particularly to means for folding the end flaps of packages, and the primary object of the invention is to provide means whereby the end flaps of a package are folded two or more times, thereby producing in effect a lock fold which will effectively close the end of the package and remain in locked condition without requiring the use of an adhesive, the means provided by the present invention for accomplishing this result being relatively simple in construction so that it is not liable to require frequent adjustment or repair and its mode of operation is such that it perform its functions rapidly and with certainty.

To these and other ends, the invention consists in certain improvements, and combinations and arrangements of parts, all as will be hereinafter more fully described, the novel features being pointed out particularly in the claims at the end of the specification.

Figure 9:
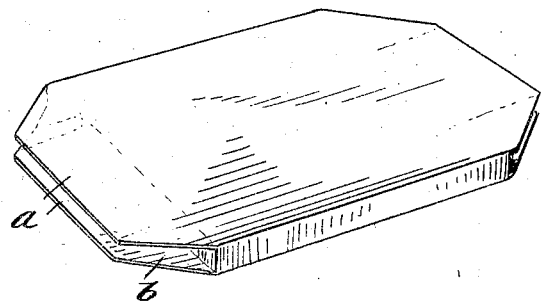
Figure 10:
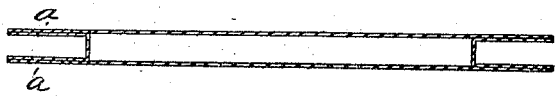
Figure 11:
Figure 12:
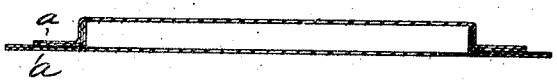
Figure 13:
Figure 14:
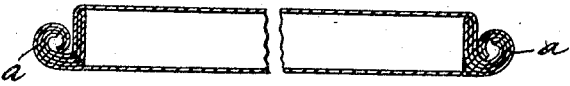
Figure 15:
Figure 16:
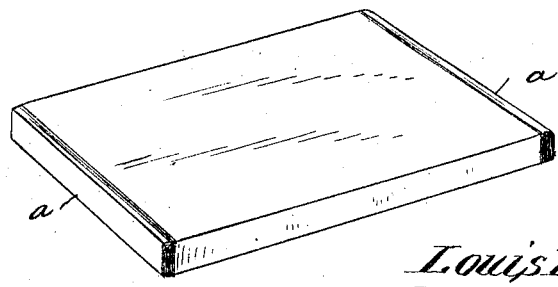

In the accompanying drawings:—Figure 1 is a top plan view of folding mechanism constructed in accordance with one embodiment of the invention; Fig. 2 represents a longitudinal section of the mechanism on the line 2—2 of Fig. 1; Fig. 3 represents a transverse section on the line 3—3 of Fig. 1; Fig. 4 represents a transverse section on the line 4—4 of Fig. 1; Fig. 5 represents a transverse section on the line 5—5 of Fig. 1; Fig. 6 represents a transverse section on the line 6—6 of Fig. 1; Fig. 7 represents a section on the line 7—7 of Fig. 1; Fig. 8 represents a section on the line 8—8 of Fig. 1; Fig. 9 is a perspective view of the package showing the condition of the end flaps thereon at the time the package enters the folding mechanism; Fig. 10 represents a central longitudinal section through the package with the end flaps in the condition shown in Fig. 9; Figs. 11 and 12 represent central longitudinal sections of the package showing two steps in the operation of preparing the end flaps for the folding operation; Figs. 13, 14 and 15 show the progressive steps in the operation of folding the end flaps, the folding operation being complete in Fig. 15; and Fig. 16 is a perspective view of the completely folded package.

Similar parts are designated by the same reference characters in the several views.

Folding mechanism embodying the present invention is applicable generally to packaging machines of various types, the mechanism being capable of effectively closing and folding the end flaps of the packages irrespective of the contents of the package or the manner in which the packages are made up, the invention, however, being particularly adapted to operate upon wrappers upon the two flaps of packages which are relatively flat and rectangular in general form such, for example, as packages containing cakes of chocolate, soap and the like.

The preferred embodiment of the invention is shown in the accompanying drawing and will be hereinafter described in detail, although it is to be understood that the invention is not limited to the particular construction shown and described as changes may be made in the construction and relative arrangement of the parts in carrying the invention into practice without departing from the essential features of the invention.

In the present instance, 1 designates a table of suitable construction which serves as a guide or support over which the packages move during the closing and folding of the end flaps thereof, the advancing movement of the packages being effected by any suitable means such, for example, as a conveyer which, however, forms no part of the present invention. The packages preferably slide in a flatwise position along the surface of the table which is preferably horizontal, and the packages are held in proper relation to the table top and to the flap-closing and folding devices by a pair of guides 2 which extend in parallelism with the table top and are suitably supported in such position, these guides preferably engaging the packages at or adjacent to the ends thereof. The surface 3 of the table along which the packages travel is raised or elevated above the sides of the table and is of a width corresponding to the length of the package, depressed channels 4 being thereby formed at the opposite longitudinal edges of the package supporting surface 3. The closing of the end flaps of the package is effected by a pair of folders 5 which in the present instance are fastened in stationary position upon the table top and at opposite sides of the package supporting surface 3 thereon by screws or equivalent devices 6. These folders are of duplicate construction although they are mounted in reverse relation, each folder having its inner longitudinal edge formed on its under side with an undercut edge 7 the surface of which is in substantially the plane of the package supporting surface 3 on the table top, the channel thus formed at each side of the package supporting surface 3 of the table being of sufficient width to accommodate the end flaps of the package. The forward end of each folder is formed with a bevel or incline 8 which leads to and provides an enlarged entrance to the channel formed by the undercut surface 7 of the folder, this beveled or inclined surface of each folder also performing the function of flattening the upper end flap of the package down upon the corresponding lower end flap of the package as the latter is advanced relatively to the folders. The corner 9 which is formed on each folder between the inner longitudinal edge thereof and the undercut edge 7 is preferably relatively sharp and the corner 10 which is formed at each longitudinal edge of the raised surface 3 on the table and is diagonally opposite to the corner 9 is also preferably sharp whereby these corners may operate upon the opposed flaps of the wrapper immediately adjacent to the body of the package and thereby produce a creasing effect which will enable the flaps to be folded sharply at these points and to remain in folded condition.

Beyond or in rear of the folders 5 are a pair of folders 11 which are also arranged at opposite sides of the package supporting surface 3 on the table, these folders being duplicates but arranged in reverse relation. Each of the folders 11 serves to roll up the respective end flaps of the wrapper, the end flaps at each end of the package being at this time lapped in close relation. Each of the folders 11 is formed with a slot 12 which is arranged in substantially the same plane with the package supporting surface 3, and at the forward end of the folder this slot is of a width sufficient to accommodate the flattened end flaps of the package. To facilitate the entrance of the end flaps of the package into the slot 12, the forward end of the folder is formed with a beveled or inclined surface 13 which provides an enlarged entrance to the slot. Each folder is also formed with a bore 14 which is preferably cylindrical in cross section and this bore extends in a diagonal direction from the outer end of the slot 12 at the entrance end of the folder to the edge of the package supporting surface 3 on the table, and the slot 12 is tangential to the bore 14. As the package is advanced between the folders 11, the flattened end flaps thereof enter the slot 12 and the extreme edges of the end flaps enter the bore 14 and as the package advances, the flattened end flaps are rolled in a direction toward the body of the package owing to the convergent relation of the bores 14 and when the package reaches the rear ends of the folders 11, the end flaps on the package will be completely rolled against the ends of the package. In order to enable the folders 11 to be readily opened so as to enable fragments of the package to be removed therefrom should the same become torn, each folder 11 is preferably composed of a pair of sections 15 and 16 which are pivotally connected by a hinge 17, the section 15 being fixed to the top of the table by screws 18 and the upper pivoted section 16 may be provided with a knob or handle 19 to facilitate opening thereof. In order to normally retain the folders 11 in closed condition, a spring 20 may be provided for the pivoted section of each folder and this spring may bear on a detent 21 which is attached to the section 16, the end of the detent being flattened on two sides whereby the pivoted section 16 may be retained by the spring either in open or closed position.

Devices are provided in rear of or beyond the folders 11 to flatten the rolled flaps on the ends of the wrapper and thereby produce lock folds. In the present instance, a pair of leaf springs 22 are provided, these springs being suitably fixed for example to the lower or stationary sections 15 of the folders 11 and their free ends are located at opposite sides of the package supporting surface 3 on the table, these operative portions of the springs having an inherent tendency to move inwardly and when the package is moved along the surface 3 of the table and between these springs, the latter bear upon the rolled ends of the package and thereby flatten them into their final form.

Figs. 9 to 16 inclusive of the drawing show diagrammatically the different steps performed by the folding mechanism hereinbefore described for producing the lock folds on the ends of the package. Fig. 9 shows the condition of the package before it is operated upon by the folders 5, the opposed end flaps *a* extending in parallelism from the opposite ends of the package as shown in Fig. 10, and the corners *b* of the wrapper are folded inwardly. Fig. 11 shows the condition of the end flaps of the wrapper when the package occupies the position indicated by the section line 4—4, the upper end flap *a* being then partially flattened down upon the lower end flap *a*. Fig. 12 shows the condition of the end flaps of the wrapper when the package occupies the position indicated by the section line 5—5 of Fig. 1, the upper end flaps *a* being then completely folded down against the lower end flaps *a*. When the package reaches the position indicated by the section line 6—6 of Fig. 1, the operation of rolling the end flaps begins as indicated in Fig. 13, and this rolling operation progresses as the package advances owing to the convergent relation of the bores 14, the end flaps of the wrapper being curled within this cylindrical bore. Fig. 14 shows the end flaps of the wrapper in completely rolled condition, the package occupying at this time the position indicated by the section line 7—7 of Fig. 1. After the end flaps have been rolled in this manner, the rolled flaps are flattened by the springs 22, the condition of the end flaps at this time being indicated by Fig. 15. In the present instance, the end flaps are folded twice upon themselves, thus producing a lock fold which will remain in folded or closed condition without requiring the use of an adhesive. It is obvious, however, that the parts may be so proportioned as to produce two or more folds of the end flaps as may be desired or necessary.

Folding mechanism embodying the present invention is relatively simple in construction and the folding operations are effected by relatively stationary parts and the different operations proceed as the package is advanced in a rectilinear direction so that the operation of feeding the packages to the folding mechanism may be simple and the packages may move continuously during the folding operations, complicated mechanisms which are liable to require frequent adjustment and repair being thus avoided, and moreover, the mechanism has a large capacity.

I claim as my invention:—

1. The combination of means operative upon the end flaps of a wrapper to roll the same against the respective ends of the body of the wrapper, and means operative to flatten the rolled flaps to form a fold.

2. The combination of means operative to simultaneously roll the superposed flaps at opposite ends of a wrapper, and means operative to flatten the rolled flaps to produce a fold.

3. The combination of means embodying cylindrical walls operative to roll the flaps of a wrapper toward and directly against the body of the wrapper, and means operative to flatten the rolled flaps against the body of the wrapper, the flap rolling means converging toward said flap flattening means.

4. The combination of means embodying converging cylindrical walls operative to roll the flaps of a wrapper directly against the body thereof, and means operative to flatten the rolled flaps against the body of the wrapper to form a multiple fold thereof.

5. The combination of means embodying converging cylindrical walls operative to roll the flaps of a wrapper directly against the body thereof, and means operative to flatten the rolled flaps against the body of the wrapper to produce a double fold thereof.

6. The combination of means for superposing and pressing one flap of a wrapper against an opposed flap thereof, means embodying converging cylindrical walls operative to roll the superposed flaps while pressed together, and means operative to flatten the rolled flaps to form a fold.

7. The combination of means for pressing one end flap of a wrapper flatwise against the opposed end flap thereof, means for rolling such flaps while pressed together, and means embodying converging cylindrical walls operative to flatten the rolled flaps.

8. The combination of a support along which packages are adapted to travel, means at opposite sides of said support operative to roll the opposite end flaps of a package while the latter travels along said support, and means operative to flatten the rolled flaps against the respective ends of the package as the package advances on said support.

9. The combination of a support along which packages are adapted to travel, means operative to press a flap of a package against an opposed flap thereof, means for forming such flaps into a roll while pressed together, and means for flattening the rolled flaps, said means being operative successively as the package is advanced along said support.

10. The combination of a support along which packages are adapted to travel, means at opposite sides of said support for rolling the opposite end flaps of a package as the latter advances along said support, and means at opposite sides of said support for flattening the rolled flaps as the package advances along said support.

11. The combination of a support along which packages are adapted to travel, means at opposite sides of said support for pressing together the flaps at the opposite ends of a package, means for rolling the end flaps, and means for flattening the rolled flaps against the respective ends of the package.

12. The combination of a runway for packages, means for pressing together the opposed flaps at the ends of a package on said runway, means at opposite sides of the runway operative to roll the end flaps toward the respective ends of the package, and means for flattening the rolled flaps against the ends of the package.

13. The combination of a runway for packages, a pair of pressing members fixed at opposite sides of the runway and operative to press together the opposed flaps at the ends of a package moving along the runway, a pair of folders fixed at opposite sides of the runway and operative to roll the end flaps as the package advances along the runway, and means arranged at opposite sides of the runway and operative to flatten the rolled flaps against the respective ends of the package.

14. A folder embodying a member having a slot in which the flattened flaps of a wrapper may move longitudinally, and an angularly extending bore tangential to said slot and operative to form the flaps into a complete roll as the flaps move longitudinally, and means for flattening the roll at a point beyond said bore.

15. A folder embodying a member having a guiding edge to abut against the body of a package, a slot extending from said edge and adapted to receive the flaps of the package, and a cylindrical bore tangential to said slot and convergent with respect to said edge, and pressing means located beyond said bore and operative toward said guiding edge.

16. A folder having an abutment and guiding edge, a slot extending therefrom and adapted to receive and press together the flaps of a wrapper, and a cylindrical roll-forming bore tangential to said slot and convergent with respect to said edge, and a pressing device located beyond said bore and acting in a direction toward said guiding edge.

17. A folder composed of relatively separable sections and having a slot formed between them to receive and press together the flaps of a wrapper and also having a bore formed between them which is tangential to said slot and is operative to form said flaps into a complete roll, said slot and bore being accessible when the sections are relatively separated, and means located beyond said bore and operative to flatten the roll formed therein.

18. The combination of a pair of relatively fixed folders operative to roll the flaps at opposite ends of a package, and a pair of yieldably-operating devices to press upon and flatten the rolled flaps at the ends of the package as the latter is passed between them.

19. The combination of a runway for packages, and pairs of devices spaced longitudinally and arranged at opposite sides thereof for rolling the end flaps of the packages and subsequently flattening such rolled flaps against the ends of the packages as the latter travel along said runway.

20. The combination of means for offsetting and pressing one flap of a package flatwise against an opposed flap thereof which is in the plane of its respective side of the package, means for forming such flaps into a roll against the body of the package, and means for flattening the rolled flaps against the body of the package.

In testimony whereof I have hereunto set my hand in presence of two subscribing witnesses.

LOUIS FISCHER.

Witnesses:
J. T. PARRISH,
C. T. McCUISTON.